Patented July 24, 1934

1,967,685

UNITED STATES PATENT OFFICE 1,967,685

CONDENSATION PROCESS YIELDING ARTIFICIAL MASSES OF THE UREA FORMALDEHYDE TYPE

Wilhelm Pungs and Karl Eisenmann, Ludwigshafen-on-the-Rhine, Germany, assignors, by mesne assignments, to Unyte Corporation, New York, N. Y., a corporation of Delaware No Drawing. Application February 28, 1931, Serial No. 519,251. In Germany March 26, 1930

6 Claims. (Cl. 260—3)

The present invention relates to a condensation process yielding artificial masses of the urea formaldehyde type.

We have found that valuable condensation products are obtained by heating at a pressure above atmospheric pressure to temperatures above 100° C. solutions or suspensions in organic hydroxyl bearing solvents of a water-soluble mixture of compounds of the urea type and formaldehyde type, i. e., of urea and/or thiourea and formaldehyde or its polymers, or of the corresponding mono- or dimethylol compounds or the anhydrides obtainable from the latter by splitting off water or of mixtures of the said substances. The condensation is preferably effected in the entire absence of water and if desired with an addition of condensing agents. Substances having an acid, alkaline or neutral reaction are suitable as condensing agents. The temperatures used for the heating should as a rule be below 160° C.; generally a temperature of working between 120° and 160° C. will be employed, the temperature range between 120° and 145° C. furnishing the best results. When working below 120° C., the addition of condensing agents will as a rule be necessary. The elevated pressure is produced by carrying out the heating in a closed vessel. The pressure thus established depends of course on the nature of the solvent employed and will as a rule not exceed about 15 atmospheres. When using in the above condensation process alcohols of a boiling point of about 100° to 120° C. and carrying out the condensation in a closed vessel at temperatures of about 120° to 145° C., a pressure is developed of between about 5 and 10 atmospheres.

By reason of the employment of elevated pressures and temperatures substantially above 100° C., the condensation is completed after a short period of time, even without employing condensing agents and with quantitative yields and without the formation of jelly-like products though highly concentrated solutions may be obtained. Working under pressure has the advantage that even at temperatures considerably above 100° C., as for example from 130° to 140° C., the condensation may be carried out without the condensation products decomposing. Very slight decomposition sets in as a rule only above 150° C. As the solvents or suspending agents those which boil above 100° C. are most suitable, as for example isobutyl alcohol, normal butyl alcohol, benzyl alcohol, ethylene glycol mono-acetate, though methyl, ethyl or propyl and the like alcohols may also be employed. When employing organic solvents containing free hydroxyl groups, solutions of condensation products are obtained which may be directly employed as lacquers, if desired after the addition of further suitable organic solvents, such as esters, ketones, or hydrocarbons in small quantities insufficient for a precipitation of the condensation products, and/or of substances, such as water-insoluble cellulose derivatives, as for example nitrocellulose, cellulose carboxylates or ethers, which are capable of forming solid solutions with the condensation products and which may be used together with blown animal or vegetable oils, or of fillers, softening agents as for example tri-aryl phosphates or phthalic esters and the like or of mixtures of these substances. Solid condensation products may be recovered from the condensation solution by the addition of large amounts of organic solvents having a precipitating action, as for example ethyl ether, benzene and the like, or by steam distillation. The solid products thus obtained may be dissolved in the usual lacquer solvents employed in the manufacture of lacquers or varnishes or moulded under mechanical pressure while heating. Products obtained from thiourea or its derivatives or mixtures containing the same often separate from the reaction mixture but these products may be equally employed for the production of moulded articles.

The following examples will further illustrate the nature of this invention, but the invention is not restricted to these examples. The parts are by weight.

*Example 1*

180 parts of trioxymethylene are suspended in 300 parts of normal butyl alcohol. 30 parts of an aqueous N/2 caustic soda solution are added to the suspension while heating. After the whole of the trioxymethylene has dissolved the whole is cooled and neutralized with N/2 sulphuric acid using bromthymol blue as the indicator. After adding 90 parts of urea, the reaction mixture is heated to 135° C. in an autoclave for 2 hours while stirring, a pressure of 9 atmospheres being set up.

After cooling a clear neutral solution is obtained which may be employed directly as a varnish.

*Example 2*

200 parts of dimethylol urea are heated to 135° C. for 2 hours in an autoclave with 200 parts of neutral isobutyl alcohol at a pressure of 8 atmospheres. When cooled, a clear solution is obtained from which, by steam distillation, the solid condensation product is obtained. This may be pressed into moulded articles, if desired after the addition of cellulose or other filler, or worked up into a varnish or lacquer, if desired after the addition of organic film-forming substances, as for example nitrocellulose and vegetable or animal oils such as castor oil which have been pretreated at about from 160° to 170° C. with air, the said additions being employed each in quantities equal to that of the condensation product together with a solvent mixture consisting of 30 parts each of butyl alcohol, butyl acetate, ethyl alcohol and 10 parts of toluene.

*Example 3*

240 parts of dimethylol urea and 60 parts of dimethylol-thiourea are heated in an autoclave together with 300 parts of iso-butanol for 2 hours at 120° C. and 7 atmospheres. The condensation product separates out as a granular, insoluble powder which, after drying, can be moulded by pressing into articles of high mechanical stability. If the condensation be carried out in the presence of a small quantity of an acid, such as 1 part of formc acid, a transparent solution of the condensation product is obtained.

What we claim is:

1. A process for the production of urea-aldehyde condensation products from water-soluble initial materials consisting in incorporating the initial materials in an alcoholic medium and condensing said initial materials by subjecting them to temperatures above 100° C. under superatmospheric pressure.

2. A process for the production of urea-aldehyde condensation products from water-soluble initial materials consisting in incorporating the initial materials in an alcoholic medium and condensing said initial materials by subjecting them to a temperature between 120° and 160° C. under superatmospheric pressure.

3. A process for the production of urea-aldehyde condensation products from water-soluble initial materials consisting in incorporating the initial materials in an alcoholic medium boiling above 100° and condensing said initial materials by subjecting them to temperatures above 100° C. under superatmospheric pressure.

4. A process for the production of urea-aldehyde condensation products from water-soluble initial materials comprising carrying out the condensation with a concentrated alcoholic solution of the initial materials at a temperature above 100° C. and under superatmospheric pressure.

5. A process for the production of urea-aldyde condensation products from water-soluble initial materials comprising carrying out the condensation with a concentrated alcoholic solution of the initial materials at a temperature between 120 and 160° C. and under superatmospheric pressure.

6. A process for the production of urea-aldehyde condensation products from water-soluble initial materials comprising carrying out the condensaton wth a concentrated solution of the initial materials in an alcohol boiling above 100° C. at a temperature above 100° C. and under superatmospheric pressure.

WILHELM PUNGS.
KARL EISENMANN.